(12) United States Patent
Vedanabhatla et al.

(10) Patent No.: US 7,673,184 B2
(45) Date of Patent: Mar. 2, 2010

(54) FLOW CONTROL METHODOLOGY FOR DIGITAL RETIMING DEVICES

(75) Inventors: Kiranmai Vedanabhatla, San Jose, CA (US); Geoffrey T. Hibbert, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 418 days.

(21) Appl. No.: 11/675,004

(22) Filed: Feb. 14, 2007

(65) Prior Publication Data
US 2007/0220357 A1  Sep. 20, 2007

Related U.S. Application Data

(60) Provisional application No. 60/778,792, filed on Mar. 3, 2006, provisional application No. 60/773,472, filed on Feb. 14, 2006.

(51) Int. Cl.
*G06F 11/00* (2006.01)
(52) U.S. Cl. ............................................. 714/43; 714/4
(58) Field of Classification Search .................. 714/43, 714/44, 4, 56
See application file for complete search history.

(56) References Cited

U.S. PATENT DOCUMENTS 6,108,713 A * 8/2000 Sambamurthy et al. ..... 709/250
7,020,719 B1 * 3/2006 Grove et al. ................. 709/238
2006/0026162 A1 * 2/2006 Salmonsen et al. ............ 707/10
2006/0095630 A1 * 5/2006 Bashford et al. ............. 710/305
2006/0153177 A1 * 7/2006 Worrall et al. ............... 370/366

OTHER PUBLICATIONS

Robert C. Elliot, "Serial Attached SCSI—1.1 (SAS-1.1)", Working Draft American National Standard, Project T10/1601-D, Sep. 21, 2005, 624 pages (311-314 cited), Revision 10, Houston, Texas, USA. also can be located at http://www.t10.org. (PDF enclosed entitled Document 1, 5 pages.).

* cited by examiner

*Primary Examiner*—Dieu-Minh Le
(74) *Attorney, Agent, or Firm*—Matthew A. Pequignot; Pequignot + Myers LLC

(57) ABSTRACT

A network diagnostic device or component such as a network analyzer or a jammer that is placed in-line between two nodes in a network to perform a flow control operation transparently without the requirement of a separate link layer implementation. The network diagnostic device may include a diagnostic module configured to perform network analyzer operations, a memory a first flow control module a second flow control module. In some embodiments, when performing the flow control operation, various modules and/or components may cause the network diagnostic device to enter a first pass-through mode and to then enter into a first flow control handshaking mode from the first pass-through mode. The various modules and/or components may also cause the network diagnostic device to enter a second pass-through mode from the first flow control handshaking mode and to then enter into a second flow control handshaking mode from the first pass-through mode.

18 Claims, 5 Drawing Sheets

FLOW CONTROL METHODOLOGY FOR DIGITAL RETIMING DEVICES

CROSS-REFERENCE TO RELATED APPLICATIONS

This application claims the benefit of U.S. Provisional Application No. 60/773,472, filed Feb. 14, 2006, and U.S. Provisional Application No. 60/778,792, filed Mar. 3, 2006, both of which are incorporated herein by reference in their entirety.

BACKGROUND

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET"), Serial Attached SCSI ("SAS"), Serial Advanced Technology Attachment ("SATA"), and Infini-Band networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind much of the advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across various networks such as Ethernet and SONET at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

BRIEF SUMMARY

Embodiments disclosed herein relate to a network diagnostic device or component such as a network analyzer or a jammer that is placed in-line between two nodes in a network to perform a flow control operation transparently without the requirement of a separate link layer implementation. The network diagnostic device may include a diagnostic module configured to perform network analyzer operations, a first memory or buffer, a second memory or buffer, a first flow control module, and a second flow control module.

In some embodiments, when performing the flow control operation, various modules and/or components may cause the network diagnostic device to enter a first pass-through mode and to then enter into a first flow control handshaking mode from the first pass-through mode. The various modules and/or components may also cause the network diagnostic device to enter a second pass-through mode from the first flow control handshaking mode and to then enter into a second flow control handshaking mode from the first pass-through mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments disclosed herein relate to a network diagnostic device or component such as a network analyzer or a jammer that is placed in-line between two nodes in a network to perform a flow control operation transparently without the requirement of a separate link layer implementation. The network diagnostic device may include a diagnostic module configured to perform network analyzer operations, a first memory or buffer, a second memory or buffer, a first flow control module, and a second flow control module.

In some embodiments, when performing the flow control operation, various modules and/or components may cause the network diagnostic device to enter a first pass-through mode and to then enter into a first flow control handshaking mode from the first pass-through mode. The various modules and/or components may also cause the network diagnostic device to enter a second pass-through mode from the first flow control handshaking mode and to then enter into a second flow control handshaking mode from the first pass-through mode.

The embodiments disclosed herein may be practiced in networking systems, including the testing of high speed data transmission systems and components. Embodiments described herein may also be used in other contexts unrelated to testing systems and components and/or unrelated to high speed data transmission. An example networking system will first be described. Then, the operation in accordance with specific embodiments disclosed herein will be described. Note that as used herein the terms "first", "second" and so forth are not intended to imply sequential ordering, but rather are intended to distinguish one element from another.

Example Networking System

Figure 1:
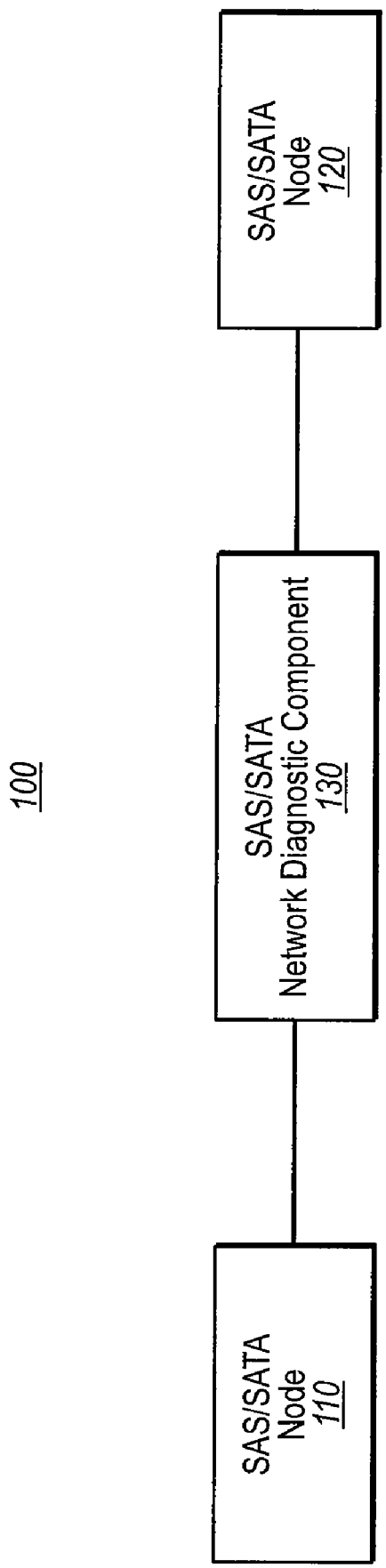
FIG. 1 illustrates a block diagram of a network including a network diagnostic component placed in-line between two nodes.

FIG. 1 is a block diagram of a networking system 100. The networking system 100 may include one or more nodes 110, 120, which communicate with each other via the networking system. As used herein, a "node" includes, but is not limited to, a server or host; a client or storage device; a switch; a hub; a router; all or a portion of a SAN fabric; a diagnostic device; and any device that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" or "network data stream" includes, but is not limited to, a packet; a datagram; a frame; a data frame; a command frame; an ordered set; a primitive; any unit of data capable of being routed (or otherwise transmitted) through a computer network; and the like. In one embodiment, a network message or data stream may comprise transmission characters used for data purposes, protocol management purposes, code violation errors, and the like.

Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like. In this description and in the claims, protocol is defined to mean at least the speed at which the nodes communicate and the communication rules that are used by the nodes when communicating.

As shown in FIG. 1, the nodes 110,120 are preferably SAS/SATA nodes. As used herein, "SAS/SATA nodes" includes nodes that are SAS compatible, nodes that are SATA compatible, and nodes that are both SAS compatible and SATA compatible. It will be appreciated, however, that the nodes 110,120 need not be SATA/SATA nodes and that the nodes 110,120 may be other types of nodes that are compatible with other types of network protocols. In addition, any reference to a node as being a host or initiator node and another node as being a target node is for illustration only. It is contemplated that nodes 110, 120 can be both host and target nodes as circumstances warrant.

The networking system 100 may comprise a network, network diagnostic system, a network testing system, or the like including network diagnostic components (such as network diagnostic component 130), which may be configured to communicate network messages among nodes. For example, the network diagnostic component 130 may be inserted between the nodes 110,120 such that network messages sent between the nodes 110,120 are available to network diagnostic component 130 and/or are routed through the network diagnostic component 130. As used herein, "in-line" denotes that a network diagnostic component is configured to have the network messages sent between two nodes routed to it so that the network messages are available to the network diagnostic component. In some embodiments the network diagnostic component may be directly in-line or it may be indirectly in-line through the use of a tap or like device. In still other embodiments, the network diagnostic component may have the network messages routed to it in any reasonable way.

In further detail, the network diagnostic component 130 may send and receive signals or data. Accordingly, using a signal, the network diagnostic component 130 may receive one or more network messages from a node, send one or more network messages to a node, or both. For example, the network diagnostic component 130 may receive one or more network messages sent between the nodes 110,120. The network diagnostic component 130 may also retransmit those network messages. In particular, the network diagnostic component 130 may receive network messages sent from the node 110 and then retransmit them to the node 120. Also, the network diagnostic component 130 may receive network messages sent from the node 120 and then retransmit them to the node 110.

Prior to retransmitting these network messages, the network diagnostic component 130 can modify the signal used to transmit the network messages. For example, the network diagnostic component 130 may digitally retime the signal, may modify the content of the messages themselves, or both. It will be appreciated that the network diagnostic component 130 may modify the signal in other desired ways. Because it is not always desirable to have the network diagnostic component 130 modify the signal, the network diagnostic component 130 may be selectively configured to modify (or not to modify) the signal used to transmit the network messages.

The network diagnostic component 130 may also perform a variety of network diagnostic functions using network messages sent between the nodes 110, 120. In performing some of these diagnostic functions, the network diagnostic component 130 may be configured to be passive to the network messages. If desired, the network diagnostic component 130 may receive at least some of the network messages, and may transmit some or all of the received traffic. In performing other diagnostic functions, the network diagnostic component 130 may be configured to modify some or all of the network traffic.

As shown in FIG. 1, the network diagnostic component 130 is preferably a SAS/SATA network diagnostic component. As used herein, "SAS/SATA network diagnostic components" includes network diagnostic components that are SAS compatible, network diagnostic components that are SATA compatible, and network diagnostic components that are both SAS compatible and SATA compatible. It will be appreciated, however, that the network diagnostic component 130 need not be a SAS/SATA network diagnostic component and that the network diagnostic component 130 may be another type of network diagnostic component that is compatible with other types of network protocols. In fact, the network diagnostic component 130 may be configured to perform its functions on any type of network and/or network topology using any number of network protocols.

In many cases, nodes 110 and 120 often perform a flow control operation to ensure the proper transmission of frames. This is especially true in SAS/SATA as the connection between nodes 110 and 120 may-be half duplex (i.e., signals can only flow in one direction at a time). The flow control operation is generally defined by the protocol of communication. For example, in SAS-STP and SATA protocols, SATA_HOLD and SATA_HOLDA primitive signals are used to manage the flow control handshaking between the devices. The SATA_HOLD primitive signal is a command sent by a device when its receive buffer is getting fall or when its transmit buffer is going empty. The SATA_HOLDA signal, on the other hand, is sent by a device to acknowledge that it has received the SATA_HOLD primitive signal.

Placing network diagnostic component 130 in-line between nodes 110 and 120, however, creates unique problems for the flow control operation. For example, the SAS-STP and SATA protocols require that a when a SATA_HOLD primitive signal is received, a SATA_HOLDA primitive signal must be returned to the sending device within 20 units of the traffic known as dwords. Nodes 110 and 120 should comply with this requirement. Since network diagnostic component 130 is an in-line device, any latency that it would add to the connection between nodes 110 and 120 would cause a violation of the 20 dword requirement. For some embodiments of network diagnostic components, it is impossible to provide a zero dword latency (e.g. if the network diagnostic component performs a digital retiming of the traffic). One example of a network diagnostic device 130 has a latency of 200 dwords which must be accounted for in the flow control operation in order to satisfy the protocols.

In the SAS-STP and SATA protocols, ALIGN/NOTIFY primitives are sent by nodes 110 and 120 at intervals as required by the protocol specification, to facilitate digital retiming methods. In some cases, ALIGN/NOTIFY primitives are sent every other dword or more often. This occurs in the rate matching case, where traffic being sent by nodes 110 or 120 has been forwarded from another network connection that is running at a slower clock rate. In many in-line devices with retiming capability such as network diagnostic device 130, ALIGN/NOTIFY primitives are not always passed through without modification. The ALIGN/NOTIFY primitives may be added or removed from the traffic in order to perform the digital retiming operation within network diagnostic component 130. In another example embodiment, the input port of the in-line device removes all of the ALIGN/NOTIFY primitives received from the initiator device. Later, an output port of the in-line device generates its own ALIGN/NOTIFY primitives, according to requirements in the protocol specification, before sending them on to the target device. However, for certain embodiments of network diagnostic component 130, it is preferred that the ALIGN/NOTIFY primitives remain unaltered from the original signal as much as possible, and so the original ALIGN/NOTIFY primitives are only added or dropped when necessary for retiming. This more preserves the original composition of the traffic stream, which may be desired when using a network diagnostic component 130. It will be appreciated that the network diagnostic component 130 may follow either of the above methods for handling ALIGN/NOTIFY primitives (i.e. minimal alteration versus complete removal and generation).

Accordingly, embodiments described herein relate to a methodology for network diagnostic component 130 to perform flow control while obeying the 20 dword response requirement, with or without rate matching present. Specifically, network diagnostic component 130 may be configured to perform flow control separately at node 110 and at node 120. In this way, both nodes 110 and 120 are able to properly transmit data frames in accordance with the protocol specifications even while having network diagnostic component 130 placed in-line between them.

Figure 2:
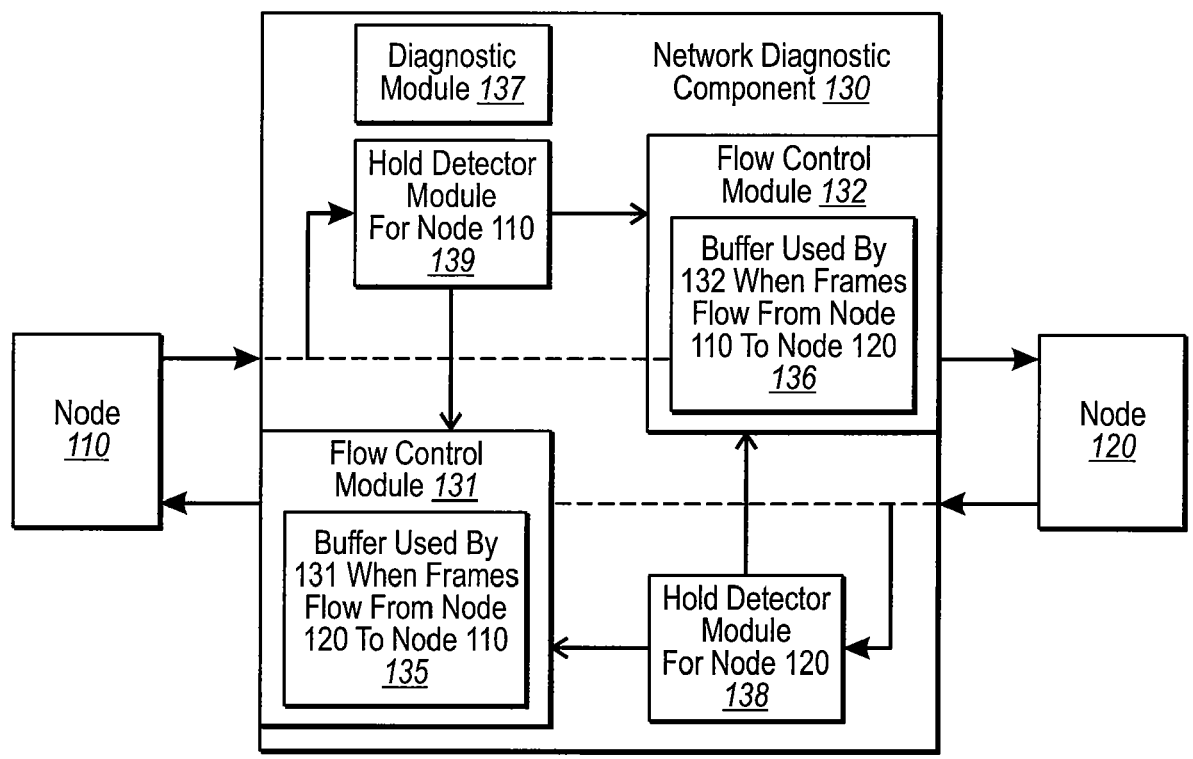
FIG. 2 illustrates a detailed view of a particular embodiment of the network of FIG. 1.

Referring now to FIG. 2, an example network diagnostic component or device 130 is illustrated. Note that network diagnostic component 130 may include various modules and/or components not illustrated in FIG. 2 as will be clear to one of skill in the art. Such modules and/or components are not illustrated so as to not distract from the principles of the present invention. Note that the embodiment of FIG. 2 is only one of numerous examples of a network 100 that can be used to implement the embodiments disclosed herein. Although the following embodiments will be described using the SAS and SATA protocols, this is by way of example only and should not be used to limit the scope of the appended claims. Other suitable protocols may also be utilized by the embodiments disclosed herein.

As illustrated, network diagnostic component 130 includes a first flow control module 131 and a second flow control module 132. Flow control module 131 is coupled to node 110 while flow control module 132 is coupled to node 120. The flow control modules 131 and 132 may be implemented in hardware, software, or any combination of the two and represent the interface between nodes 110 and 120 with network diagnostic device 130. In one embodiment, flow control modules 131 and 132 may be implemented inside Physical Layer Devices (Phy) that are configured to receive signals from and transmit signals to nodes 110 and 120 respectively. In such devices, a separate link layer that handles the transmission and reception of frames may be present, which may also handle the flow control process. Note that according to one embodiment of the present invention, network diagnostic component 130 is configured to be a passive device such that nodes 110 and 120 are unaware that they are coupled to the network diagnostic component 130. Hence, a link layer implementation is not necessary inside the network diagnostic component 130. Accordingly, network diagnostic component may be configured to perform a flow control operation transparently without the requirement of the separate link layer implementation.

Network diagnostic component 130 may also include memory or buffer 135 and memory or buffer 136, which may be any reasonable memory known to one skilled in the art. Memory or buffer 135 is configured to be coupled to or otherwise accessible to flow control module 131. Memory or buffer 136 is configured to be coupled to or otherwise accessible to flow control module 132. Accordingly, the flow control modules 131 and 132 are able to write data to and transmit data from memory or buffer 135 and 136 respectively. In one embodiment, the depth of memory or buffer 135 is configured to be approximately 240 dwords. Memory or buffer 135 and memory or buffer 136 will be discussed in more detail to follow.

FIG. 2 also illustrates that network diagnostic component 130 includes a network diagnostic module 137. Network diagnostic module 137 is configured to perform one or more network diagnostic functions or testing functions on network traffic transmitted from node 110 to node 120 or from node 120 to node 110. Examples of such network diagnostic or testing functions include, but are not limited to one or more of jamming, analyzing, monitoring, bit error rate testing, or generating. Accordingly, network diagnostic component or device 130 may be configured to be one or more of a bit error rate tester, a protocol analyzer, a generator, a jammer, and a monitor as will be explained in more detail to follow.

Example Flow Control Methodology

Figure 3:
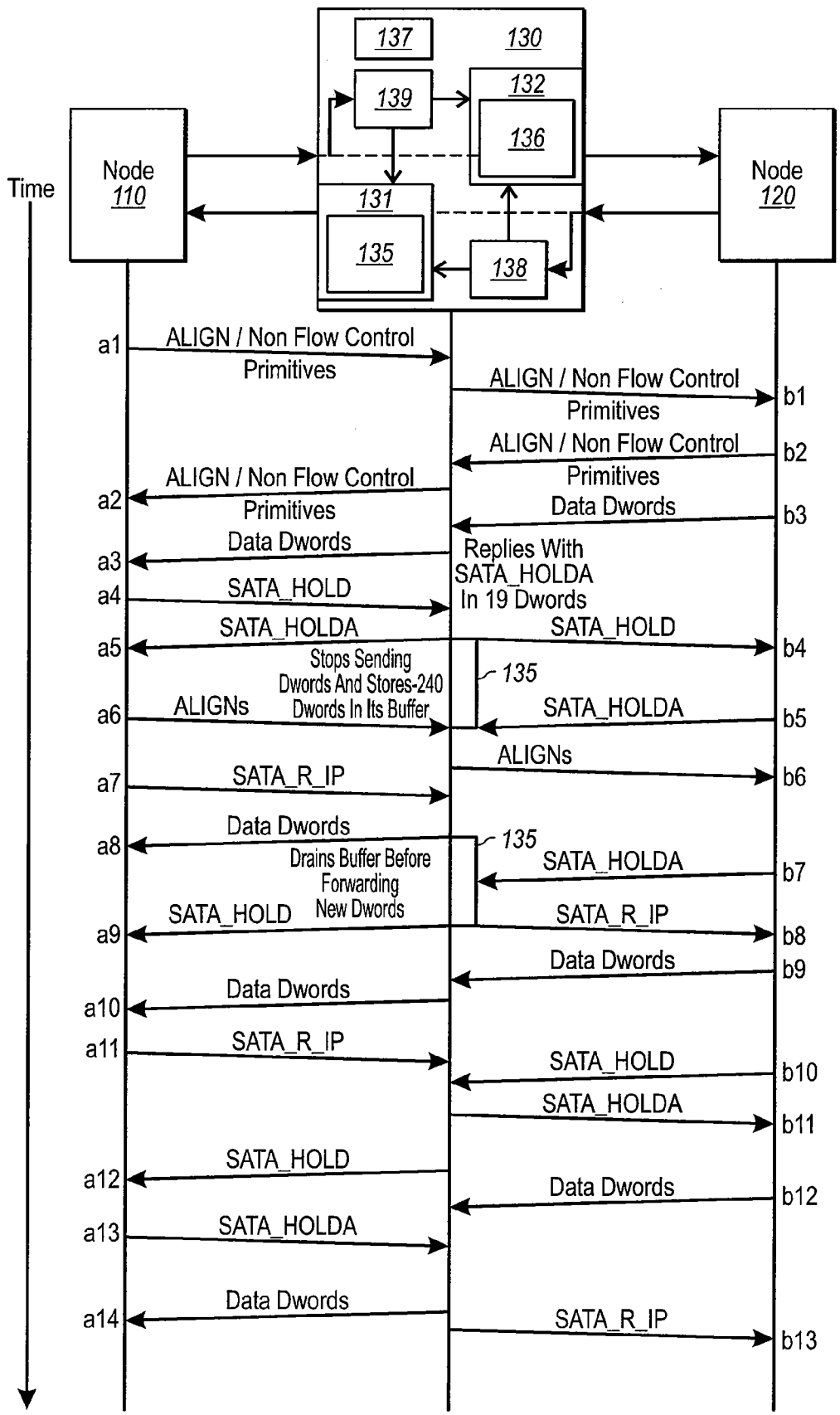
FIG. 3 illustrates a flow chart of a flow control methodology in accordance with the principles of the present invention.

Reference is now made to FIG. 3, which illustrates an example flow control flow chart or diagram of the present invention. Note that FIG. 3 includes an illustration of nodes 110 and 120 that were previously described. In addition, FIG. 3 depicts flow control module 131 and flow control module 132 for network diagnostic component 130. As mentioned previously, flow control module 131 represents the interface between node 110 and network diagnostic component 130 while flow control module 132 represents the interface between node 120 and component 130.

FIG. 3 further illustrates that network diagnostic component 130 includes memory or buffer 135 (hereinafter referred to as buffer 135 for simplicity) that is used in the flow control operation by the flow control module 131. FIG. 3 also illustrates that network diagnostic component 130 includes memory or buffer 136 (hereinafter referred to as buffer 136 for simplicity) that is used in the flow control operation by the flow control module 132. As mentioned, each of the buffers should have enough depth to account for the latency of network diagnostic component 130 and the amount of time it takes to send and receive the flow control primitives (e.g., SATA_HOLD and SATA_HOLDA).

For example, in one sample embodiment, it is determined that the minimum depth of buffer 135 should be approximately 240 dwords. This depth is derived by determining the latency of the in-line device (e.g., network diagnostic component 130), which in this embodiment is 200 dwords. The latency is then added to the time taken to a transmit a SATA_HOLD primitive to an end device, which is 20 dwords in the sample embodiment. The time taken for the end device to respond, which is typically 20 dwords, is then added to the above values. The sum is 240 dwords. Note that this is only a specific example of deriving the minimum depth of buffer 135. It is contemplated that minimum buffer depths of less than or more than 240 dwords may be implemented as circumstances warrant, such as when implementing an in-line device with a smaller latency. Of course, any buffer with a depth that is larger than the desired minimum may be utilized in the flow control process. Using the smallest possible buffer, however, will save valuable memory space and associated costs.

FIG. 3 further illustrates four different phases of the flow control operation. These are operation in a first pass-through mode, entering into a first flow control handshaking mode from the first pass-through mode, entering from the first flow-control handshaking mode into a second pass-through mode and entering into a second flow control handshaking mode from the second pass through mode. Each of these phases will be explained in more detail to follow. Note that these four phases represent only one specific example of the flow control methodology of the present invention. It is anticipated that in some circumstances, the flow control methodology may employ fewer or more phases than the three that are described herein. In addition, the order that the different phases are explained in is for ease of illustration only, and it not meant to imply that this order must be followed in every instance.

Pass-Through Mode

Referring to FIG. 3, at time a1, node 110 begins to transmit ALIGN/NOTIFY primitive signals and non-flow control primitive signals. Example non-flow control primitive signals would be signals that may be used to initiate handshaking prior to transmission of frames. These signals are received by node 120 during time b1. At time b2, node 120 transmits ALIGN/NOTIFY primitive signals and non-flow control primitive signals that are received at node 110 during time a2. During this phase, network diagnostic component 130 acts as a passive device that passes through or forwards all of the signals sent to and from the two nodes.

At time b3, node 120, which in this embodiment acts as a target node, originates data frames for transmission to node 110. These frames include Data dwords, which are received by node 110 at time a3 and stored in a receive buffer until further use by node 110. As mentioned previously, the Data dwords are forwarded through network diagnostic component 130.

Entering into First Flow Control Handshaking Mode from First Pass-Through Mode

At time a4, node 110, which in this embodiment is the initiator node, is getting close to the point that it cannot accommodate many more Data dwords in its receive buffer. Accordingly, it then transmits a continuous SATA_HOLD primitive sequence to node 120 to inform node 120 to pause sending data until node 110 has sufficient space in the buffer. A SATA_HOLD detector module 139, present inside the network diagnostic component 130 detects that a SATA_HOLD signal sequence is received by network diagnostic component 130 and sends control signals to both flow control module 131 and flow control module 132. As a consequence, network diagnostic component 130 stops forwarding any Data dwords to node 110. Instead, network diagnostic component 130 begins to store the Data dwords received at flow control module 131 in buffer 135.

In addition, network diagnostic component 130 responds during time a5 to node 110 at flow control module 131 with a continuous SATA_HOLDA primitive signal within 20 dwords. As previously discussed, node 110 expects a SATA_HOLDA primitive signal within 20 dwords of sending the SATA_HOLD primitive signal.

At the same time as flow control module 131 is sending the SATA_HOLDA signal to node 110, flow control module 132 sends a SATA_HOLD primitive to node 120 to tell it to stop sourcing Data dwords, which is received by node 120 at time b4. At time b5, node 120 stops sending the Data dwords and begins to send a SATA_HOLDA primitive, as node 120 is required by the protocol to respond to a SATA_HOLD primitive signal with a SATA_HOLDA primitive signal. The Data dwords that are sent by node 120 after it received the SATA_HOLD primitive, but before it stopped transmitting, are stored in buffer 135.

At time b5, the total number of Data dwords stored in buffer 135 is approximately 240. The 240 dwords are the number of dwords that were stored between the time node 110 first sent the SATA_HOLD signal and the time that node 120 responded with the SATA_HOLDA primitive, including latency through 130. As mentioned above in greater detail, the 240 dwords represents the sum total of the latency of network diagnostic component 130 (200 dwords) and the time it took to transmit the SATA_HOLD to node 120 and for node 120 to respond with a SATA_HOLDA primitive.

At time a6, node 110 sends ALIGN primitive signals. These signals are forwarded through network diagnostic component 130 to node 120 without any modification. The signals are received by node 120 at time b6.

As illustrated, network diagnostic component 130 does not alter these ALIGN primitives. In general, network diagnostic component 130 is configured to pass through all ALIGN/NOTIFY primitives at all times. One of the benefits of passing through ALIGN primitives is that it allows network diagnostic component 130 to handle rate matching without the need for special ALIGN/NOTIFY generation logic.

At time a7, node 110 has drained it's receive buffer and is ready to receive new dwords into its buffer. It notifies node 120 by transmitting the SATA_R_IP (SATA Receive in progress) primitive signal. A SATA_R_IP detect flag is received by flow control module 131, which starts to transmit the contents of buffer 135 to node 110 at time a8. In addition, flow control module 132 continues to transmit a SATA_HOLD primitive signal to node 120 while buffer 135 is being emptied. In response to the SATA_HOLD primitive signals, node 120 continues to send SATA_HOLDA primitive signals to flow control module 131 at time b7.

Entering from First Flow Control Handshaking Mode into Second Pass-Through Mode

After buffer 135 is completely empty, flow control module 131 sends SATA_HOLD primitives to node 110 at time a9. At the same time, flow control module 132 passes the SATA_R_IP primitive signal received from node 110 to node 120. The SATA_R_IP signal is received by node 120 at time b8.

The SATA_HOLD primitive signals are sent to node 110 by flow control module 131 until new Data dwords are received by flow control module 131 from node 120. When the new Data dwords are received, network diagnostic component 130 returns to pass-through mode. The Data dwords are received by node 110 at time a10.

Entering from Second Pass-Through Mode into Second Flow Control Handshaking Mode At time b10, the transmit buffer of node 120 goes empty. As mentioned above, this causes node 120 to transmit SATA_HOLD primitive signals to node 110. A SATA_HOLD detector module 138, present inside the network diagnostic component 130 detects that a SATA_HOLD signal sequence is received by network diagnostic component 130 and sends control signals to both flow control module 131 and flow control module 132. This control signal is received by flow control module 132, which responds by providing a SATA_HOLDA primitive signal to node 120 at time b11 within the specified 20 dwords.

Node 110 is transmitting SATA_R_IP signal while it is receiving Data dwords from network diagnostic component 130, which is indicated in FIG. 3 at time a11. At time a12, the SATA_HOLD primitive signals embedded within the frame are passed from flow control module 131 to node 110. In response, node 110 transmits SATA_HOLDA primitive signals at time a13 as long as node 110 receives SATA_HOLD primitive signals. When network diagnostic component 130 stops receiving SATA_HOLD primitive signals embedded inside frame from node 120 and instead receives Data dwords, these are passed through to node 110. The Data dwords are received by node 110 at time a14. Also, when network diagnostic component 130 receives SATA_HOLDA from node 110 at flow control module 132, it begins replacing the SATA_HOLDA primitives with SATA_R_IP primitives at time b13. When network diagnostic component 130 begins receiving SATA_R_IP primitives from node 110, network diagnostic component returns completely to a pass-through mode.

Accordingly, the embodiments described herein allow for flow control in a digital retiming in-line device. Specifically, the embodiments described herein enable switch over from HOLD/HOLDA handshaking mode to data pass-through mode and vice versa to be accomplished so that data may be transmitted between two devices in accordance with protocol specifications while taking into account any inherent latency of the in-line device.

Example Methods

Figure 4:
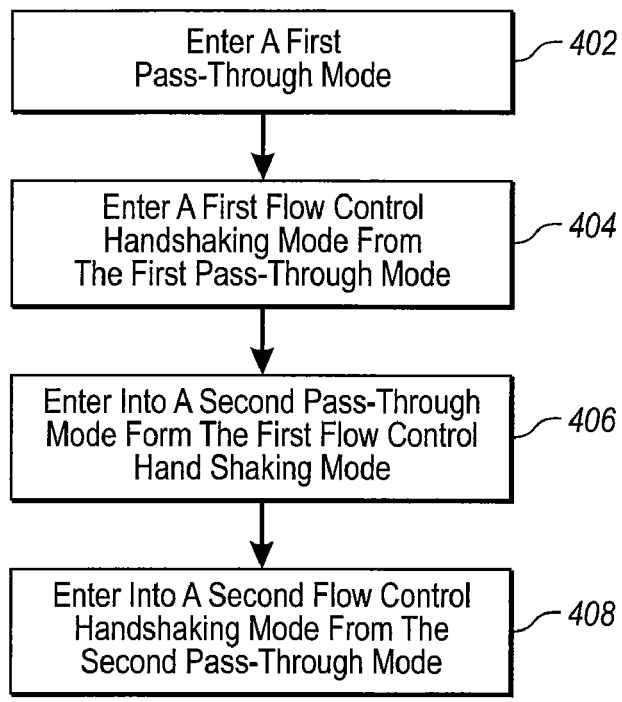
FIG. 4 illustrates a method for a network diagnostic component or device that is in-line between first and second nodes to perform a flow control operation.

Referring now to FIG. 4, a method 400 for a network diagnostic component or device that is in-line between first and second nodes to perform a flow control transparently without the requirement of a separate link layer implementation is illustrated. Note that network diagnostic component, which may be a jammer or an analyzer, includes a network diagnostic module configured to perform one or more diagnostic functions. Method 400 will be described in relation to FIGS. 2 and 3, although this is for illustration only. One skilled in the art will appreciate that method 400 may be practiced in a variety of network environments.

Method 400 includes entering 402 a first pass-through mode. For example, network diagnostic component 130 may enter into a pass-through mode such that network traffic is passed substantially unaltered between nodes 110 and 120.

Figure 5:
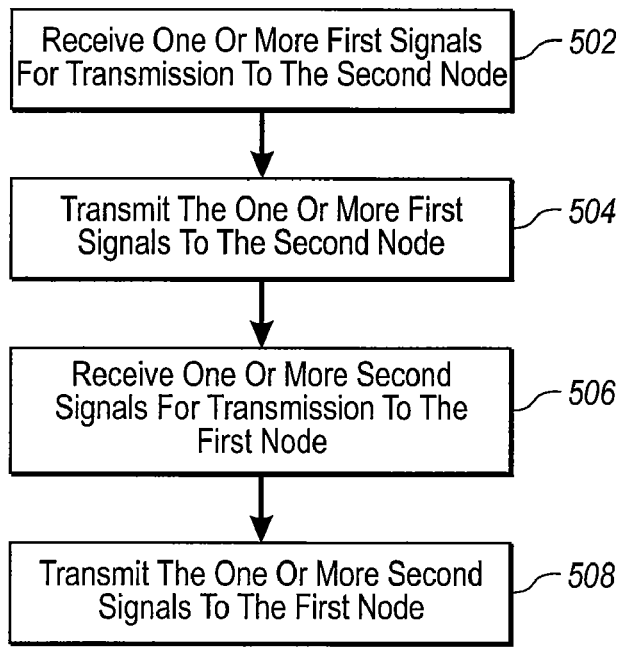
FIG. 5 illustrates a method for a network diagnostic component to enter into a first pass-through mode.

Referring now to FIG. 5, a more particular method 500 for a network diagnostic component to enter into a first pass-through mode is illustrated. The various steps and actions of method 500 may correspond to step or action 402 of method 400, although this not required. Note that the steps or actions of method 500 discussed below are not intended to be exhaustive as those skilled in the art will appreciate that method 500 may include additional steps not illustrated in FIG. 5.

Method 500 includes receiving 502 one or more first signals for transmission to the second node, wherein the one or more first signals received from node 110 are passed through the network diagnostic component 130 to node 120. For example, flow control module 132 may receive an ALIGN or other non flow control primitive signal(s) (i.e., the first signal) from node 110 for transmission to node 120. Flow control module 132 may then pass the ALIGN or other non flow control primitive signal to node 120.

Method 500 also includes transmitting 504 the one or more first signals to the second node, wherein the one or more first signals are substantially unaltered by the network diagnostic device. For example, second flow control module 132 may then transmit the ALIGN or other non flow control primitive signal(s) to the second node 120. As mentioned previously, in a pass-through mode network diagnostic component 130 typically passes the signals from node 110 to node 120 or from node 120 to node 110 substantially unaltered. However, in some embodiments so retiming may occur.

Method 500 further includes receiving 506 one or more second signals for transmission to the first node, wherein the one or more second signals are received from node 120 are passed through the network diagnostic component 130 to node 110. For example, second flow control module 131 may receive one or more data signals (i.e., the second signal) from node 120 for transmission to node 110. Flow control module 131 may then pass the one or more data signals to node 110.

Method 500 additionally includes transmitting 508 the one or more second signals to the first node, wherein the one or more second signals are substantially unaltered by the network diagnostic device. For example, second flow control module 131 may then transmit the one or more data signals to the first node 110. As mentioned previously, in pass-through mode network diagnostic component 130 typically passes the signals from node 110 to node 120 or from node 120 to node 110 substantially unaltered. However, in some embodiments so retiming may occur.

Returning to FIG. 4, method 400 also includes entering 404 a first flow control handshaking mode from the first pass-through mode. For example, network diagnostic component 130 may enter from the first pass through mode to the first flow control handshaking mode.

Figure 6:
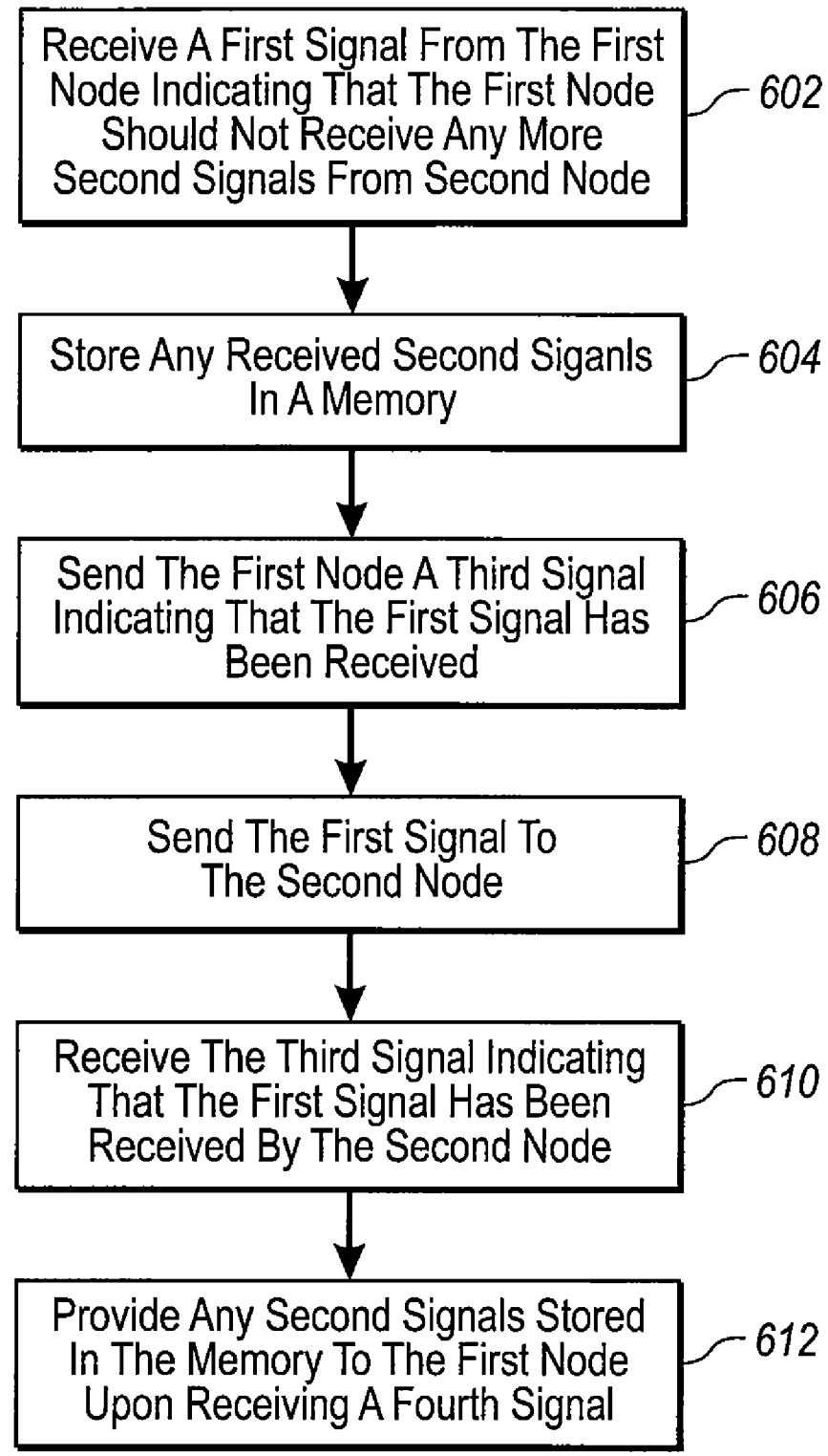
FIG. 6 illustrates a method for a network diagnostic component to enter a first flow control handshaking mode from a first pass-through mode.

Referring now to FIG. 6, a more particular method 600 for a network diagnostic component to enter a first flow control handshaking mode from the first pass-through mode is illustrated. The various steps and actions of method 600 may correspond to step or action 404 of method 400, although this not required. Note that the steps or actions of method 600 discussed below are not intended to be exhaustive as those skilled in the art will appreciate that method 600 may include additional steps not illustrated in FIG. 6.

Method 600 includes receiving 602 a first signal from the first node, the first signal indicating that the first node should not receive any more second signals from the second node. For example, network diagnostic component 130, specifically flow control module 131 may receive a SATA_HOLD (i.e., the first signal) detect flag via the SATA_HOLD detector module 139 from node 110. As mentioned, node 110 sends a SATA_HOLD signal to indicate that its receive buffer is almost full and that it should not receive any more data signals (i.e., the second signal) from node 120.

Method 600 also includes storing 604 any received second signals in the memory. For example, network diagnostic component 130, specifically flow control module 131 may store any data signals that are received by flow control module 131 in buffer 135 after receiving the SATA_HOLD detect flag from SATA_HOLD detector module 139. In other words, network diagnostic component 130 stops forwarding any data signals to node 110 and instead begins to store them in buffer 135.

Method 600 further includes sending 606 the first node a third signal indicating that the first signal has been received. For example, flow control module 131 may send a SATA_HOLDA signal (i.e., the third signal) to node 110 to indicate that the SATA_HOLD signal has been received.

Method 600 additionally includes sending 608 the first signal to the second node. For example, flow control module 132 may send a SATA_HOLD signal to node to inform node 120 to stop sending data signals.

Method 600 also includes receiving 610 the third signal indicating that the first signal has been received by the second node. For example, flow control module 131 may receive a SATA_HOLDA signal from node 120 indicating that node 120 has received the SATA_HOLD signal.

Method 600 further includes providing 612 any second signals stored in the memory to the first module upon receiving a fourth signal indicating that the first node should receive the second signals. For example, network diagnostic component 130, specifically flow control module 131, may receive a SATA_R_IP (i.e., the fourth signal) detect flag from the first node 110. As mentioned, first node 110 sends the SATA_R_IP signal after it has drained its receive buffer is ready to receive more data signals. In response, flow control module 131 may begin to provide the data signals stored in buffer 135 to node 110.

Turning again to FIG. 4, in some embodiments method 400 further includes entering 406 into a second pass-through mode first flow control handshaking mode and entering 408 into a second flow control handshaking mode from the second pass-through mode. For example, network diagnostic component 130 may perform theses actions or steps in a manner similar to the steps or actions described in methods 500 and 600 and as previously described in relation to FIG. 3 above.

Example Network Diagnostic Functions

As mentioned above, the network diagnostic component 130 may perform a variety of network diagnostic functions. The network diagnostic component 130 may be configured to function as any combination of: a bit error rate tester, a protocol analyzer, a generator, a jammer, a monitor, and any other appropriate network diagnostic device.

Bit Error Rate Tester

In some embodiments, the network diagnostic component 130 may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate test may determine whether the received version of the bit sequence (or at least a portion of the received version) matches and/or does not match the initial version of the bit sequence (or at least a portion of the initial version). The bit error tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, and the like may use the bit error rate tester to determine whether their components comply with a protocol-specified bit error rate. Also, when communication components are deployed, the bit error tester may be used to identify defects in a deployed physical communication path, which then may be physically inspected.

Protocol Analyzer

In some embodiments, the network diagnostic component 130 may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol-adapted network messages. Preferably, the protocol analyzer may passively receive the network messages via passive network connections.

The protocol analyzer may be configured to compare the received bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re-initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network analyzer may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least one network message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receive a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send a trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network-message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, the network diagnostic component 130 may function as a generator. The generator may generate and/or transmit a bit sequence via one or more communication paths or channels. Typically, the bit sequence comprises network messages, such as, packets, frames, or other protocol-adapted network messages. The network messages may comprise simulated network traffic between nodes on a network. In one embodiment, the bit sequence may be a predefined sequence of messages. Advantageously, a network administrator may evaluate how the nodes (and/or other nodes on the network) respond to the simulated network traffic. Thus, the network administrator may be able to identify performance deviations and take appropriate measures to help avoid future performance deviations.

In one embodiment, the generator may execute a script to generate the simulated network traffic. The script may allow the generator to dynamically simulate network traffic by functioning as a state machine or in any other suitable manner. For example, a script might include one or more elements like the following: "In state X, if network message A is received, transmit network message B and move to state Y." The generator may advantageously recognize network messages (and any characteristics thereof) in any other suitable manner, including but not limited to how a protocol analyzer may recognize network messages (and any characteristics thereof). The script may also include a time delay instructing the generator to wait an indicated amount of time after receiving a message before transmitting a message in response. In response to receiving a message, a generator may transmit a response message that is completely predefined. However, in response to receiving a message, a generator may transmit a response message that is not completely predefined, for example, a response message that includes some data or other portion of the received message.

Jammer

In some embodiments, the network diagnostic component 130 may function as a jammer. The jammer may receive, generate, and/or transmit one or more bit sequences via one or more communication paths or channels. Typically, the bit sequences comprise network messages (such as, packets, frames, or other protocol-adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors.

By altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 130 may include any suitable jamming (or other network diagnostic system or method) disclosed in U.S. Pat. No. 6,268,808 B1 to Iryami et al., entitled HIGH SPEED DATA MODIFICATION SYSTEM AND METHOD, which is hereby incorporated by reference herein in its entirety.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, the network diagnostic component 130 may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received a bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC error, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component 130 may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety Example Systems It will be appreciated that the network diagnostic component 130 may be used to implement a variety of systems.

In one embodiment, the network diagnostic component 130 may comprise a printed circuit board. The printed circuit board may include a CPU module.

In one embodiment, the network diagnostic component 130 may comprise a blade. The blade may include a printed circuit board, an interface, or any combination thereof.

In one embodiment, the network diagnostic component 130 may comprise a chassis computing system. The chassis computing system may include one or more CPU modules, which may be adapted to interface with one, two, or more blades or other printed circuit boards. For example, a blade may have an interface though which a diagnostic module may send network diagnostic data to a CPU module of the chassis computing system. The chassis computer system may be adapted to receive one or more printed circuit boards or blades.

A CPU module may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

In one embodiment, the network diagnostic component 130 may comprise an appliance. Depending on the particular configuration, the appliance may include any suitable combination of one or more CPU modules and one or more diagnostic modules. In one embodiment, an appliance may include and/or be in communication with one or more storage devices, which may advantageously be used for storing any suitable diagnostic data, statistics, and the like. In one embodiment, an appliance may include and/or be in communication with one or more client interface modules, which may advantageously be used for displaying information to a user, receiving user input from a client software program, sending information to a client software program, or both. The appliance may also include and/or be in communication with one or more display devices (such as, a monitor) adapted to display information, one or more user input devices (such as, a keyboard, a mouse, a touch screen, and the like) adapted to receive user input, or both.

It will be appreciated that the network diagnostic component 130 may comprise any of a variety of other suitable network diagnostic components.

Example Operating And Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A network diagnostic component placed in-line between first and second nodes in a network comprising:
    a diagnostic module configured to perform one or more diagnostic operations;
    a first memory;
    a second memory;
    a first flow control module; and
    a second flow control module, wherein the network diagnostic component is configured to perform a flow control operation transparently without the requirement of a separate link layer implementation, wherein the flow control operation comprises:
        entering into a first pass-through mode, wherein entering the first pass-through mode comprises:
            receiving one or more first signals for transmission to the second node, wherein the one or more first signals are received from the first node and passed to the second flow control module;
            transmitting the one or more first signals to the second node, wherein the one or more first signals are substantially unaltered by the network diagnostic component;
            receiving one or more second signals for transmission to the first node, wherein the one or more second signals are received from the second node and passed to the first flow control module; and
            transmitting the one or more second signals to the first node, wherein the one or more second signals are substantially unaltered by the network diagnostic component; and
        entering into a first flow control handshaking mode from the first pass-through mode.

2. The network diagnostic component in accordance with claim 1, wherein the one or more diagnostic operations include jamming, analyzing, monitoring, bit error rate testing, and generating.

3. The network diagnostic component in accordance with claim 1, wherein the network diagnostic component is one of a bit error rate tester, a protocol analyzer, a generator, a jammer, and a monitor.

4. The network diagnostic component in accordance with claim 1, wherein the flow control operation further comprises:
    entering into a second pass-through mode from the first flow control handshaking mode; and
    entering into a second flow control handshaking mode from the second pass-through mode.

5. The network diagnostic component in accordance with claim 1, wherein entering the first flow control handshaking mode comprises at least:
    receiving a first signal from the first node, the first signal indicating that the first node should not receive any more second signals from the second node;
    storing any received second signals in the first memory;
    sending the first node a third signal indicating that the first signal has been received;
    sending the first signal to the second node;
    receiving the third signal indicating that the first signal has been received by the second node; and
    providing any second signals stored in the second memory to the first flow control module upon receiving a fourth signal indicating that the first node should receive the second signals.

6. The network diagnostic component in accordance with claim 1, wherein the first or second memory is a buffer with an approximately 240 dword depth.

7. The network diagnostic component in accordance with claim 1, wherein the network diagnostic component is configured to operate with the SAS or SATA protocol.

8. A network analyzer placed in-line between first and second nodes in a network comprising:
    a diagnostic module configured to perform network analyzer operations;
    a first memory;
    a second memory;
    a first flow control module; and
    a second flow control module, wherein the network analyzer is configured to perform a flow control operation transparently without the requirement of a separate link layer implementation, wherein the flow control operation comprises:
        entering into a first pass-through mode; and
        entering into a first flow control handshaking mode from the first pass-through mode, wherein entering the first flow control handshaking mode comprises at least:
            receiving a first signal from the first node, the first signal indicating that the first node should not receive any more second signals from the second node;
            storing any second signals received at the second flow control module in the first memory;
            sending the first node a third signal indicating that the first signal has been received;
            sending the first signal to the second node;
            receiving the third signal indicating that the first signal has been received by the second node; and
            providing any second signals stored in the second memory to the first flow control module upon receiving a fourth signal indicating that the first node should receive the second signals.

9. The network analyzer in accordance with claim 8, wherein the flow control operation further comprises:
    entering into a second pass-through mode first flow control handshaking mode; and
    entering into a second flow control handshaking mode from the second pass-through mode.

10. The network analyzer in accordance with claim 8, wherein entering the first pass-through mode comprises at least:
    receiving one or more first signals for transmission to the second node, wherein the one or more first signals are received from the first node and passed to the second flow control module;
    transmitting the one or more first signals to the second node, wherein the one or more first signals are substantially unaltered by the network diagnostic component;
    receiving one or more second signals for transmission to the first node, wherein the one or more second signals are received from the second node and passed to the first flow control module; and transmitting the one or more second signals to the first node, wherein the one or more second signals are substantially unaltered by the network diagnostic component.

11. The network analyzer in accordance with claim 8, wherein the first or second memory is a buffer with an approximately 240 dword depth.

12. The network analyzer in accordance with claim 8, wherein the network diagnostic component is configured to operate with the SAS or SATA protocol.

13. A method for a network diagnostic component that is placed in-line between first and second nodes in a network to perform a flow control operation transparently without the requirement of a separate link layer implementation, wherein the network diagnostic component includes at least a network diagnostic module, the method comprising:
    entering into a first pass-through mode, wherein entering the first pass-through mode comprises:
        receiving one or more first signals for transmission to the second node, wherein the one or more first signals are received by the first flow control module and passed to the second flow control module;
        transmitting the one or more first signals to the second node, wherein the one or more first signals are substantially unaltered by the network diagnostic component;
        receiving one or more second signals for transmission to the first node, wherein the one or more second signals are received by the second flow control module and passed to the first flow control module; and
        transmitting the one or more second signals to the first node, wherein the one or more second signals are substantially unaltered by the network diagnostic component; and
    entering into a first flow control handshaking mode from the first pass-through mode.

14. The method in accordance with claim 13, further comprising:
    entering into a second pass-through mode first flow control handshaking mode; and
    entering into a second flow control handshaking mode from the second pass-through mode.

15. The method in accordance with claim 13, wherein the network diagnostic component is configured to operate with the SAS or SATA protocol.

16. The method in accordance with claim 13, wherein the network diagnostic module is configured to perform one of jamming, analyzing, monitoring, bit error rate testing, or generating.

17. The method in accordance with claim 13, wherein the network diagnostic component is one of a bit error rate tester, a protocol analyzer, a generator, a jammer, and a monitor.

18. A method for a network diagnostic component that is placed in-line between first and second nodes in a network to perform a flow control operation transparently without the requirement of a separate link layer implementation, wherein the network diagnostic component includes at least a network diagnostic module, the method comprising:
    entering into a first pass-through mode; and
    entering into a first flow control handshaking mode from the first pass-through mode, wherein entering the first flow control handshaking mode comprises:
        receiving a first signal from the first node, the first signal indicating that the first node should not receive any more second signals from the second node;
        storing any second signals received at the second flow control module in the memory;
        sending the first node a third signal indicating that the first signal has been received;
        sending the first signal to the second node;
        receiving the third signal indicating that the first signal has been received by the second node; and
        providing any second signals stored in the memory to the first module upon receiving a fourth signal indicating that the first node should receive the second signals.

* * * * *